US012659119B2

(12) United States Patent
Jiang et al.

(10) Patent No.: US 12,659,119 B2
(45) Date of Patent: Jun. 16, 2026

(54) METHOD AND DEVICE FOR INDICATING A REFERENCE RESOURCE FOR QUASI-CO-LOCATED DOWNLINK DATA RECEPTION

(71) Applicant: Apogee Networks, LLC, Dallas, TX (US)

(72) Inventors: Qi Jiang, Shanghai (CN); Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 231 days.

(21) Appl. No.: 18/379,171

(22) Filed: Oct. 12, 2023

(65) Prior Publication Data

US 2024/0039674 A1     Feb. 1, 2024

Related U.S. Application Data

(63) Continuation of application No. PCT/CN2022/085675, filed on Apr. 8, 2022.

(30) Foreign Application Priority Data

Apr. 21, 2021     (CN) .......................... 202110428377.7

(51) Int. Cl.
*H04L 5/00* (2006.01)
*H04W 72/232* (2023.01)

(52) U.S. Cl.
CPC .......... *H04L 5/0053* (2013.01); *H04L 5/0007* (2013.01); *H04L 5/0051* (2013.01); *H04W 72/232* (2023.01)

(58) Field of Classification Search
CPC ... H04L 5/0053; H04L 5/0007; H04L 5/0051; H04L 5/00; H04L 5/0023; H04L 5/0048;
(Continued)

(56) References Cited

U.S. PATENT DOCUMENTS 11,419,173 B2      8/2022    Deenoo et al.
11,595,179 B2 *    2/2023    Miao ...................... H04B 7/024
(Continued)

FOREIGN PATENT DOCUMENTS

CN        109150467 A      1/2019
CN        110266452 A      9/2019
(Continued)

OTHER PUBLICATIONS

ISR received in application No. PCT/CN2022/085675 dated Jun. 20, 2022.
(Continued)

*Primary Examiner* — John D Blanton
(74) *Attorney, Agent, or Firm* — Volpe Koenig

(57)     ABSTRACT

Method and device in nodes for wireless communications. A node firstly receives a first signaling in a first time-frequency resource set, the first signaling indicating a target reference signal resource; and receives a first signal in a second time-frequency resource set; a DMRS of a channel occupied by the first signal is QCL with the target reference signal resource; a target reference signal resource set comprises K1 candidate reference signal resources, with the first signaling indicating the target reference signal resource among the K1 candidate reference signal resources; at least either of frequency-domain resources occupied by the second time-frequency resource set or time-domain resources occupied by the second time-frequency resource set are used to determine the target reference signal resource set. Present application improves the method of indicating data-scheduling beams with multiple search spaces under M-TRP being combined monitored, thus reducing the signaling overhead and optimizing the system performance.

20 Claims, 4 Drawing Sheets

(58) Field of Classification Search

CPC .............. H04L 5/0094; H04W 72/232; H04W 72/0446; H04W 72/0453; H04B 7/06968; H04B 7/0413

See application file for complete search history.

(56) References Cited

U.S. PATENT DOCUMENTS

| | | | | |
|---|---|---|---|---|
| 11,785,594 | B2 * | 10/2023 | Khoshnevisan | ........ H04L 1/189 370/329 |
| 11,974,270 | B2 * | 4/2024 | Matsumura | ........... H04L 5/0051 |
| 12,126,449 | B2 | 10/2024 | Zhao | |
| 2020/0119879 | A1 * | 4/2020 | Chen | .................... H04W 72/23 |
| 2020/0145159 | A1 * | 5/2020 | Tsai | ....................... H04L 5/0048 |
| 2020/0288479 | A1 * | 9/2020 | Xi | ......................... H04L 5/0092 |
| 2020/0337058 | A1 * | 10/2020 | Song | ....................... H04L 5/0053 |
| 2020/0351055 | A1 * | 11/2020 | Manolakos | ............ H04B 7/088 |
| 2020/0403682 | A1 * | 12/2020 | Koskela | ................ H04W 80/02 |
| 2021/0021394 | A1 | 1/2021 | Wu et al. | |
| 2021/0044403 | A1 * | 2/2021 | Zhang | ................... H04L 5/0053 |
| 2021/0051643 | A1 * | 2/2021 | Jiang | ................... H04W 52/242 |
| 2021/0160880 | A1 * | 5/2021 | Zhang | ................... H04W 72/23 |
| 2021/0320710 | A1 * | 10/2021 | Koskela | ............ H04B 7/06964 |
| 2021/0337584 | A1 * | 10/2021 | Zhang | ................... H04W 72/23 |
| 2022/0070704 | A1 * | 3/2022 | Khoshnevisan | ...... H04L 5/0023 |
| 2022/0141818 | A1 * | 5/2022 | Jiang | ..................... H04W 72/21 370/329 |
| 2022/0256566 | A1 * | 8/2022 | Gao | .......................... H04L 1/08 |
| 2023/0037549 | A1 * | 2/2023 | Zheng | .................... H04B 7/024 |
| 2023/0048114 | A1 * | 2/2023 | Wu | ....................... H04W 72/23 |
| 2023/0049517 | A1 * | 2/2023 | Wu | ....................... H04B 7/0695 |
| 2023/0140056 | A1 * | 5/2023 | Zhou | .................... H04B 7/0619 370/330 |
| 2023/0208597 | A1 * | 6/2023 | Yao | ...................... H04B 7/0695 370/329 |
| 2023/0283433 | A1 * | 9/2023 | Jiang | .................... H04L 5/0051 |
| 2023/0291525 | A1 * | 9/2023 | Zhou | .................... H04B 7/088 |
| 2023/0308237 | A1 * | 9/2023 | Yi | ......................... H04L 5/0048 |
| 2023/0362667 | A1 * | 11/2023 | Jiang | .................... H04L 5/0051 |
| 2023/0371105 | A1 * | 11/2023 | Yu | ......................... H04W 76/18 |
| 2023/0397226 | A1 * | 12/2023 | Matsumura | ....... H04W 72/1268 |
| 2024/0039674 | A1 * | 2/2024 | Jiang | ..................... H04L 5/0023 |
| 2024/0121641 | A1 * | 4/2024 | Matsumura | ........... H04L 5/0051 |
| 2024/0187162 | A1 * | 6/2024 | Nilsson | ................ H04B 7/0695 |
| 2024/0205695 | A1 * | 6/2024 | Muruganathan | ...... H04L 5/0069 |
| 2025/0220453 | A1 * | 7/2025 | Noh | ................... H04B 7/15528 |

FOREIGN PATENT DOCUMENTS

| | | |
|---|---|---|
| CN | 111543014 A | 8/2020 |
| CN | 111901083 A | 11/2020 |

OTHER PUBLICATIONS

ZTE"Further details on Multi-beam and Multi-TRP operation" 3GPP TSG RAN WG1 Meeting #103-e R1-2007770 Nov. 2, 2020.

Third Generation Partnership Project, "Technical Specification Group Radio Access Network; NR; Physical channels and modulation (Release 16)," 3GPP TS 38.211 V16.5.0 (Mar. 2021).

Third Generation Partnership Project, "Technical Specification Group Radio Access Network; NR; Multiplexing and channel coding (Release 16)," 3GPP TS 38.212 V16.5.0 (Mar. 2021).

Third Generation Partnership Project, "Technical Specification Group Radio Access Network; NR; Physical layer procedures for control (Release 16)," 3GPP TS 38.213 V16.5.0 (Mar. 2021).

Third Generation Partnership Project, "Technical Specification Group Radio Access Network; NR; Physical layer procedures for data (Release 16)," 3GPP TS 38.214 V16.5.0 (Mar. 2021).

Third Generation Partnership Project, "Technical Specification Group Radio Access Network; NR; Physical layer measurements (Release 16)," 3GPP TS 38.215 V16.4.0 (Dec. 2020).

Third Generation Partnership Project, "Technical Specification Group Radio Access Network; NR; Medium Access Control (MAC) protocol specification (Release 16)," 3GPP TS 38.321 V16.4.0 (Mar. 2021).

Third Generation Partnership Project, "Technical Specification Group Radio Access Network; NR; Radio Resource Control (RRC) protocol specification (Release 16)," 3GPP TS 38.331 V16.4.1 (Mar. 2021).

* cited by examiner

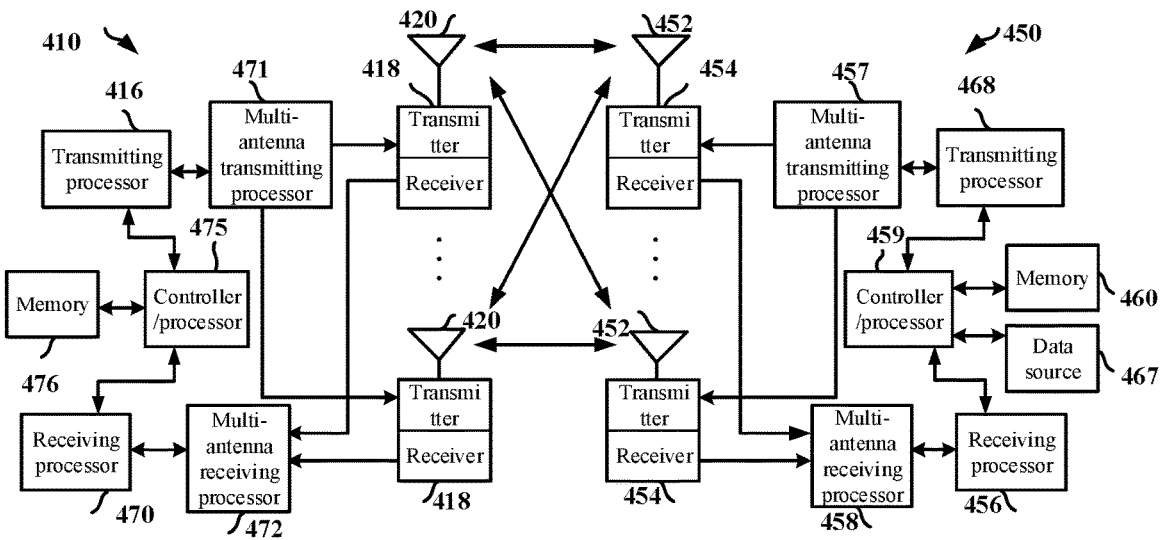

FIG. 4

Second node N2          First node U1

S20. transmitting first information block

————————first information block————————▶

F0. optional        S10. receiving first information block

S21. transmitting first signaling in first time-frequency resource set

————————first signaling————————▶

S11. receiving first signaling in first time-frequency resource set

S22. transmitting first signal in second time-frequency resource set

————————first signal————————▶

S12. receiving first signal in second time-frequency resource set

End            End

FIG. 5 one of K1 beams

FIG. 6 one of M1 first-type
control channel candidates one of M1 second-type
control channel candidates First TRP                              Second TRP First node

METHOD AND DEVICE FOR INDICATING A REFERENCE RESOURCE FOR QUASI-CO-LOCATED DOWNLINK DATA RECEPTION

CROSS REFERENCE TO RELATED APPLICATIONS

This application is the continuation of the international patent application No. PCT/CN2022/085675, filed on Apr. 8, 2022, claims the priority benefit of Chinese Patent Application No. 202110428377.7, filed on Apr. 21, 2021, the full disclosure of which is incorporated herein by reference.

BACKGROUND

Technical Field

The present application relates to transmission methods and devices in wireless communication systems, and in particular to a design scheme and device of beams used by the data channel in wireless communications.

Related Art

In 5G New Radio (NR), Massive Multi-Input Multi-Output (MIMO) is a key technology. In Massive MIMO, multiple antennas form through Beamforming a narrow beam pointing in a specific direction to enhance communication quality. The Control Resource Set (CORESET) and the Search Space Set used for Physical Downlink Control Channel (PDCCH) monitoring are defined in 5G NR, and each search space set is associated with one CORESET, where the CORESET is used for configuring information such as frequency-domain resources, the mapping of Control Channel Elements (CCEs) to Resource Element Group (REG) and Transmission Configuration Indication (TCI); while the search space set is used for configuring time-domain resources occupied by the PDCCH, supported Downlink Control Information (DCI) Format, supported Aggregation Level (AL) as well as the number of PDCCH Candidates supported by various ALs. At the same time, each CORESET Pool is configured with a group of Transmission Configuration Indication (TCI) states, among which the DCI will indicate a TCI state to be used for determining a Beam used by a scheduled data channel.

In discussions around the NR R17, for Multi-TRP scenarios, and for the purpose of enhancing the PDCCH reliability, a terminal can perform combined detection on two associated PDCCH Candidates to improve the performance.

SUMMARY

Inventors find through researches that the TCIs used by the Physical Downlink Shared Channel (PDSCH) currently are indicated by the PDCCH, and each terminal shall be configured one TCI set based on a CORESET Pool and activate part of it through a MAC CE, and then it is up to the activated TCIs in the PDCCH to indicate TCIs that are actually used. When two CORESETs for combined blind detection are respectively associated with different CORESET Pools, it will be necessary to determine to which CORESET Pool a TCI set corresponds shall be used. A simple solution to the above problem is to add a new field in the PDCCH to explicitly indicate the TCI set corresponding to the CORESET Pool that should be chosen, but as a result, there will be some extra overhead of the control signaling and a reduction in the spectral efficiency.

To address the above problem, the present application provides a solution. It should be noted that though the present application only took the massive MIMO and beam-based communications as a typical or exemplary scenario in the statement above, it is also applicable to other scenarios such as LTE multi-antenna system, where similar technical effects can be achieved. Additionally, the adoption of a unified solution for various scenarios, including but not limited to massive MIMO, beam-based communications, and LTE multi-antenna system, contributes to the reduction of hardcore complexity and costs. In the case of no conflict, the embodiments of any node and the characteristics in the embodiments may be applied to any other node, and vice versa. What's more, the embodiments in the present application and the characteristics in the embodiments can be arbitrarily combined if there is no conflict.

To address the above problems, the present application provides a method and device of determining beams used by the data channel for multi-TRP scenarios. It should be noted that if no conflict is incurred, embodiments in a User Equipment (UE) in the present application and the characteristics of the embodiments are also applicable to a base station, and vice versa. What's more, the embodiments in the present application and the characteristics in the embodiments can be arbitrarily combined if there is no conflict. Further, though originally targeted at cellular networks, the present application also applies to the Internet of Things (IoT) and Vehicle-to-Everything (V2X). Further, though originally targeted at multicarrier communications, the present application also applies to single-carrier communications. Further, though originally targeted at multi-antenna communications, the present application also applies to single-antenna communications. Further, the present application is designed targeting terminal-base station scenario, but can be extended to inter-terminal communications, terminal-relay communications, Non-Terrestrial Networks (NTN) as well as relay-base station communications, where similar technical effects can be achieved. Additionally, the adoption of a unified solution for various scenarios, including but not limited to terminal-base station communications, contributes to the reduction of hardcore complexity and costs.

Furthermore, if no conflict is incurred, embodiments in the first node in the present application and the characteristics of the embodiments are also applicable to a second node, and vice versa. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:

receiving a first signaling in a first time-frequency resource set, the first signaling indicating a target reference signal resource; and receiving a first signal in a second time-frequency resource set;

herein, a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set.

In one embodiment, a technical feature of the above method lies in that: a beam used by the first signal is determined according to implicit information associated with the second time-frequency resource set rather than explicit information, thus reducing the signaling overhead and enhancing the spectral efficiency.

According to one aspect of the present application, the target reference signal resource set is one of N reference signal resource sets, N being a positive integer greater than 1; at least either of the frequency-domain resources occupied by the second time-frequency resource set or the time-domain resources occupied by the second time-frequency resource set are used to determine the target reference signal resource set out of the N reference signal resource sets.

In one embodiment, a technical feature of the above method lies in that: any of the N reference signal resource sets can be used for determining a beam used by the first signal, so as to guarantee the flexibility of scheduling.

According to one aspect of the present application, at least either of the frequency-domain resources occupied by the second time-frequency resource set or the time-domain resources occupied by the second time-frequency resource set are used to determine a first integer, the first integer used for determining the target reference signal resource set.

According to one aspect of the present application, the first time-frequency resource set comprises a first time-frequency resource subset and a second time-frequency resource subset; the first time-frequency resource subset and the second time-frequency resource subset are respectively associated with a first control resource set and a second control resource set, and the first control resource set and the second control resource set are respectively associated with a first search space set and a second search space set; the first search space set and the second search space set are associated.

According to one aspect of the present application, comprising:

receiving a first information block;

herein, the first information block is used for indicating that the first search space set and the second search space set are associated.

According to one aspect of the present application, the sentence that the first search space set and the second search space set are associated means that: a number of Aggregation levels (Als) supported by the first search space set is equal to a number of Als supported by the second search space set, and an index of a PDCCH candidate in the first search space set is identical to an index of a PDCCH candidate in the second search space set.

According to one aspect of the present application, the first time-frequency resource subset comprises M1 first-type control channel candidates, while the second time-frequency resource subset comprises M1 second-type control channel candidates; Resource Elements (REs) occupied by the first time-frequency resource subset and REs occupied by the second time-frequency resource subset are orthogonal; the first signaling occupies one of the M1 first-type control channel candidates, and the first signaling occupies one of the M1 second-type control channel candidates; M1 is a positive integer greater than 1.

In one embodiment, a technical feature of the above method lies in that: the above method that implicitly determines a beam used by the first signal is used only when the first signaling occupies two PDCCH candidates from different Search Space Sets simultaneously, which ensures the compatibility with the traditional terminal.

The present application provides a method in a second node for wireless communications, comprising:

transmitting a first signaling in a first time-frequency resource set, the first signaling indicating a target reference signal resource; and transmitting a first signal in a second time-frequency resource set;

herein, a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set.

According to one aspect of the present application, the target reference signal resource set is one of N reference signal resource sets, N being a positive integer greater than 1; at least either of the frequency-domain resources occupied by the second time-frequency resource set or the time-domain resources occupied by the second time-frequency resource set are used to determine the target reference signal resource set out of the N reference signal resource sets.

According to one aspect of the present application, at least either of the frequency-domain resources occupied by the second time-frequency resource set or the time-domain resources occupied by the second time-frequency resource set are used to determine a first integer, the first integer used for determining the target reference signal resource set.

According to one aspect of the present application, the first time-frequency resource set comprises a first time-frequency resource subset and a second time-frequency resource subset; the first time-frequency resource subset and the second time-frequency resource subset are respectively associated with a first control resource set and a second control resource set, and the first control resource set and the second control resource set are respectively associated with a first search space set and a second search space set; the first search space set and the second search space set are associated. According to one aspect of the present application, the second information subset is used to determine a downlink control information (DCI) format supported by the first search space set and a DCI format supported by the second search space set.

According to one aspect of the present application, comprising:

transmitting a first information block;

herein, the first information block is used for indicating that the first search space set and the second search space set are associated.

According to one aspect of the present application, the sentence that the first search space set and the second search space set are associated means that: a number of Aggregation levels (Als) supported by the first search space set is equal to a number of Als supported by the second search space set, and an index of a PDCCH candidate in the first search space set is identical to an index of a PDCCH candidate in the second search space set.

According to one aspect of the present application, the first time-frequency resource subset comprises M1 first-type control channel candidates, while the second time-frequency resource subset comprises M1 second-type control channel candidates; Resource Elements (REs) occupied by the first time-frequency resource subset and REs occupied by the second time-frequency resource subset are orthogonal; the first signaling occupies one of the M1 first-type control channel candidates, and the first signaling occupies one of the M1 second-type control channel candidates; M1 is a positive integer greater than 1.

The present application provides a first node for wireless communications, comprising:

a first receiver, receiving a first signaling in a first time-frequency resource set, the first signaling indicating a target reference signal resource; and a second receiver, receiving a first signal in a second time-frequency resource set;

herein, a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set.

The present application provides a second node for wireless communications, comprising:

a first transmitter, transmitting a first signaling in a first time-frequency resource set, the first signaling indicating a target reference signal resource; and a second transmitter, transmitting a first signal in a second time-frequency resource set;

herein, a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set.

In one embodiment, compared with the prior art, the present application is advantageous in the following aspects:

determining a beam used by the first signal according to implicit information associated with the second time-frequency resource set rather than explicit information, thus reducing the signaling overhead and enhancing the spectral efficiency;

any of the N reference signal resource sets being available for use for determining a beam used by the first signal, so as to guarantee the flexibility of scheduling;

the above method that implicitly determines a beam used by the first signal only being used when the first signaling occupies two PDCCH candidates from different Search Space Sets simultaneously, which ensures the compatibility with the traditional terminal.

BRIEF DESCRIPTION OF THE DRAWINGS

Other features, objects and advantages of the present application will become more apparent from the detailed description of non-restrictive embodiments taken in conjunction with the following drawings:

FIG. 4 illustrates a schematic diagram of a first communication device and a second communication device according to one embodiment of the present application.

FIG. 5 illustrates a flowchart of a first signaling according to one embodiment of the present application.

FIG. 6 illustrates a schematic diagram of a target reference signal resource set according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
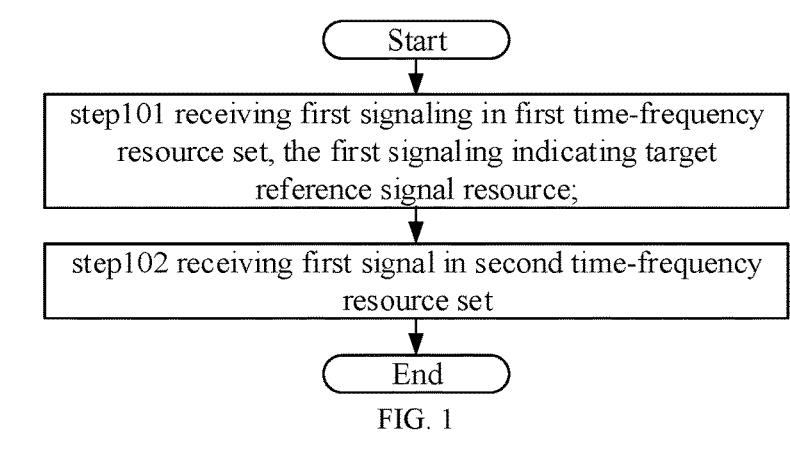
FIG. 1 illustrates a flowchart of processing of a first node according to one embodiment of the present application.

Embodiment 1 illustrates a flowchart of processing of a first node, as shown in FIG. 1. In 100 illustrated by FIG. 1, each box represents a step. In Embodiment 1, a first node in the present application receives a first signaling in a first time-frequency resource set in step 101, the first signaling indicating a target reference signal resource; and receives a first signal in a second time-frequency resource set in step 102.

In Embodiment 1, a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set.

In one embodiment, the first time-frequency resource set occupies subcarrier(s) corresponding to a positive integer number of Resource Block(s) (RB(s)) in frequency domain and a positive integer number of Orthogonal Frequency Division Multiplexing (OFDM) symbol(s) in time domain.

In one embodiment, the first time-frequency resource set occupies frequency-domain resources corresponding to at least one Control Resource Set (CORESET) in frequency domain.

In one embodiment, the first time-frequency resource set occupies frequency-domain resources corresponding to two CORESETs in frequency domain.

In one embodiment, the first time-frequency resource set occupies frequency-domain resources corresponding to at least one search space set in frequency domain.

In one embodiment, the first time-frequency resource set occupies frequency-domain resources corresponding to two search space sets in frequency domain.

In one embodiment, the first signaling is a physical layer signaling.

In one embodiment, the first signaling comprises Downlink Control Information (DCI).

In one embodiment, the first signaling comprises a DL Grant.

In one embodiment, a physical layer channel occupied by the first signaling includes a Physical Downlink Control Channel (PDCCH).

In one embodiment, the target reference signal resource comprises a Channel State Information-Reference Signal (CSI-RS) resource.

In one embodiment, the target reference signal resource comprises a Demodulation Reference Signal (DMRS) resource.

In one embodiment, the target reference signal resource comprises a Sounding Reference Signal (SRS) resource.

In one embodiment, the target reference signal resource comprises a Synchronization Signal/physical broadcast channel Block (SSB).

In one embodiment, the target reference signal resource corresponds to a Transmission Configuration Indication (TCI).

In one embodiment, the target reference signal resource corresponds to a TCI-State.

In one embodiment, the target reference signal resource corresponds to a TCI-StateId.

In one embodiment, any candidate reference signal resource among the K1 candidate reference signal resources comprises a CSI-RS resource.

In one embodiment, any candidate reference signal resource among the K1 candidate reference signal resources comprises a DMRS resource.

In one embodiment, any candidate reference signal resource among the K1 candidate reference signal resources comprises an SRS resource.

In one embodiment, any candidate reference signal resource among the K1 candidate reference signal resources comprises an SSB.

In one embodiment, any candidate reference signal resource among the K1 candidate reference signal resources corresponds to a TCI.

In one embodiment, any candidate reference signal resource among the K1 candidate reference signal resources corresponds to a TCI-State.

In one embodiment, any candidate reference signal resource among the K1 candidate reference signal resources corresponds to a TCI-StateId.

In one embodiment, the first signaling comprises a first field, the first field comprised in the first signaling indicating the target reference signal resource among the K1 candidate reference signal resources.

In one subembodiment, the first field comprised in the first signaling is a TCI field.

In one embodiment, frequency-domain resources occupied by the second time-frequency resource set are used to determine the target reference signal resource set.

In one embodiment, time-domain resources occupied by the second time-frequency resource set are used to determine the target reference signal resource set.

In one embodiment, the frequency-domain resources occupied by the second time-frequency resource set and the time-domain resources occupied by the second time-frequency resource set are used together to determine the target reference signal resource set.

In one embodiment, at least either of frequency-domain resources occupied by the second time-frequency resource set or time-domain resources occupied by the second time-frequency resource set are used for implicitly indicating the target reference signal resource set.

In one embodiment, the second time-frequency resource set occupies more than one Resource Element (RE).

In one embodiment, the second time-frequency resource set occupies subcarrier(s) corresponding to a positive integer number of RB(s) in frequency domain, and a positive integer number of OFDM symbol(s) in time domain.

In one embodiment, the first signal is transmitted in a Physical Downlink Shared CHannel (PDSCH).

In one embodiment, the first signal is a PDSCH.

In one embodiment, a transport channel occupied by the first signal includes a Downlink Shared Channel (DL-SCH).

In one embodiment, the first signal is generated by a Transport Block (TB).

In one embodiment, the first signal is generated by a Code Block Group (CBG).

In one embodiment, the first signal is generated by a bit block.

In one embodiment, the first signal is generated by two TBs.

In one embodiment, the first signal is generated by two CBGs.

In one embodiment, the first signal is generated by two bit blocks.

In one embodiment, the first signaling is used for scheduling the first signal.

In one embodiment, the first signaling is used for indicating the second time-frequency resource set.

In one embodiment, the first signaling is used to indicate time-domain resources occupied by the second time-frequency resource set.

In one embodiment, the first signaling is used to indicate frequency-domain resources occupied by the second time-frequency resource set.

In one embodiment, the first signaling is used to indicate a Modulation and Coding Scheme (MCS) used by the first signal.

In one embodiment, the first signaling is used to indicate a Hybrid Automatic Repeat reQuest (HARQ) process ID used by the first signal.

In one embodiment, the first signaling is used to indicate a Redundancy Version (RV) used by the first signal.

In one embodiment, the target reference signal resource is used for reception of the first signal.

In one embodiment, the first signal and the target reference signal resource are Quasi Co-located (QCL).

In one subembodiment, the first signal and the target reference signal resource are QCL with QCL Type D.

In one subembodiment, the first signal and the target reference signal resource are QCL with QCL Type A.

In one subembodiment, the first signal and the target reference signal resource are QCL with QCL Type B.

In one subembodiment, the first signal and the target reference signal resource are QCL with QCL Type C.

In one embodiment, the receiving includes blind detection.

In one embodiment, the receiving includes detection.

In one embodiment, the receiving includes demodulation.

Embodiment 2

Figure 2:
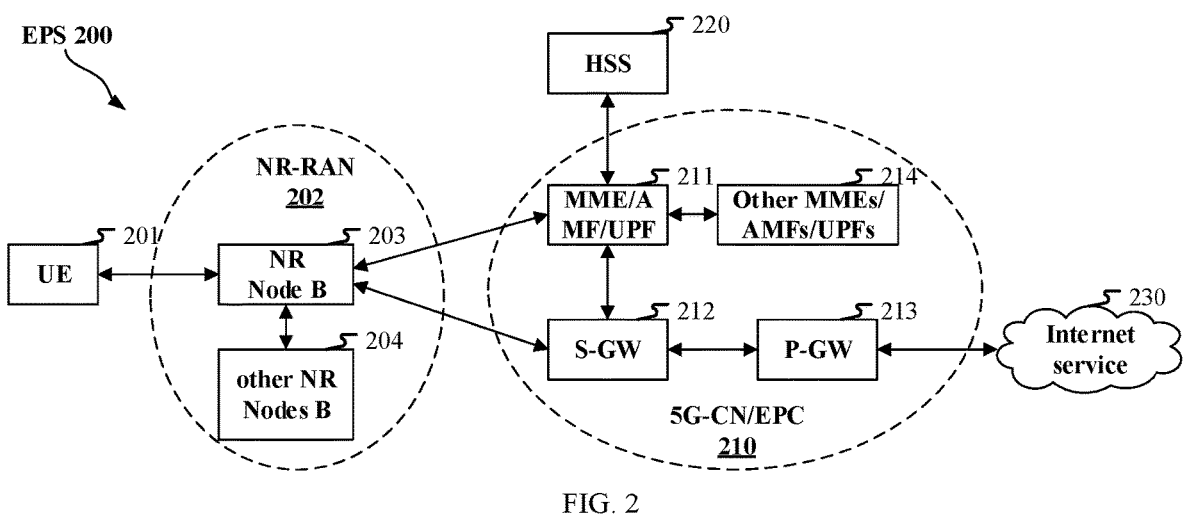
FIG. 2 illustrates a schematic diagram of a network architecture according to one embodiment of the present application.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 can receive PDCCHs from multiple TRPs simultaneously.

In one embodiment, the UE 201 is a terminal capable of monitoring multiple beams simultaneously.

In one embodiment, the UE 201 is a terminal supporting Massive-MIMO.

In one embodiment, the UE 201 is a terminal supporting Vehicle-to-Everything (V2X).

In one embodiment, the gNB203 corresponds to the second node in the present application.

In one embodiment, the gNB203 can transmit PDCCHs from multiple TRPs simultaneously.

In one embodiment, the gNB203 supports multi-beam transmission.

In one embodiment, the gNB203 supports Massive-MIMO-based transmission.

In one embodiment, the gNB203 comprises at least two TRPs.

Embodiment 3

Figure 3:
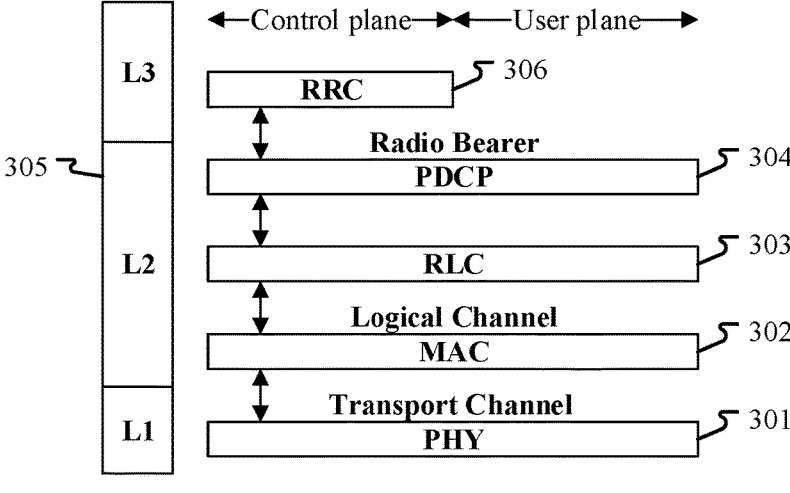
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and also provides support for handover of a second communication node between first communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The Radio Resource Control (RRC) sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the PDCP304 of the second communication node is used for generating scheduling of the first communication node.

In one embodiment, the PDCP354 of the second communication node is used for generating scheduling of the first communication node.

In one embodiment, the first signaling in the present application is generated by the MAC302 or the MAC352.

In one embodiment, the first signaling in the present application is generated by the RRC 306.

In one embodiment, the first signaling in the present application is generated by the PHY301 or the PHY351.

In one embodiment, the first signal in the present application is generated by the MAC302 or the MAC352.

In one embodiment, the first signal in the present application is generated by the RRC306.

In one embodiment, the first signal in the present application is generated by the MAC302 or the MAC352.

In one embodiment, the first information block in the present application is generated by the MAC302 or the MAC352.

In one embodiment, the first information block in the present application is generated by the RRC306.

In one embodiment, the first information block in the present application is generated by the MAC302 or the MAC352.

In one embodiment, the first node is a terminal.

In one embodiment, the second node is a terminal.

In one embodiment, the second node is a Road Side Unit (RSU).

In one embodiment, the second node is a Grouphead.

In one embodiment, the second node is a Transmitter Receiver Point (TRP).

In one embodiment, the second node is a cell.

In one embodiment, the second node is an eNB.

In one embodiment, the second node is a base station.

In one embodiment, the second node is used for managing multiple TRPs.

In one embodiment, the second node is used for managing multiple nodes of cells.

Embodiment 4

Embodiment 4 illustrates a schematic diagram of a first communication device and a second communication device according to the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first signaling in a first time-frequency resource set, the first signaling indicating a target reference signal resource; and receives a first signal in a second time-frequency resource set; a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set.

In one embodiment, the first communication node 450 comprises a memory that stores a computer readable instruction program, the computer readable instruction program generates actions when executed by at least one processor, which include: receiving a first signaling in a first time-frequency resource set, the first signaling indicating a target reference signal resource; and receiving a first signal in a second time-frequency resource set; a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first signaling in a first time-frequency resource set, the first signaling indicating a target reference signal resource; and transmits a first signal in a second time-frequency resource set; a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set.

In one embodiment, the second communication device 410 comprises a memory that stores a computer readable instruction program, the computer readable instruction program generates actions when executed by at least one processor, which include: transmitting a first signaling in a first time-frequency resource set, the first signaling indicating a target reference signal resource; and transmitting a first signal in a second time-frequency resource set; a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is network equipment.

In one embodiment, the second communication device 410 is a serving cell.

In one embodiment, the second communication device 410 is a TRP.

In one embodiment, at least the first four of the antenna 452, the receiver 454, the multi-antenna receiving processor 458, the receiving processor 456, and the controller/processor 459 are used for receiving a first signaling in a first time-frequency resource set; at least the first four of the antenna 420, the transmitter 418, the multi-antenna transmitting processor 471, the transmitting processor 416 and the controller/processor 475 are used for transmitting a first signaling in a first time-frequency resource set.

In one embodiment, at least the first four of the antenna 452, the receiver 454, the multi-antenna receiving processor 458, the receiving processor 456, and the controller/processor 459 are used for receiving a first signal in a second time-frequency resource set; at least the first four of the antenna 420, the transmitter 418, the multi-antenna transmitting processor 471, the transmitting processor 416 and the controller/processor 475 are used for transmitting a first signal in a second time-frequency resource set.

In one embodiment, at least the first four of the antenna 452, the receiver 454, the multi-antenna receiving processor 458, the receiving processor 456, and the controller/processor 459 are used for receiving a first information block; at least the first four of the antenna 420, the transmitter 418, the multi-antenna transmitting processor 471, the transmitting processor 416 and the controller/processor 475 are used for transmitting a first information block.

Embodiment 5

Embodiment 5 illustrates a flowchart of a first signaling, as shown in FIG. 5. In FIG. 5, a first node U1 and a second node N2 are in communication via a radio link; herein, steps marked by the box F0 are optional. It should be particularly noted that the sequence illustrated herein does not set any limit to the signal transmission order or implementation order in the present application.

The first node U1 receives a first information block in step S10; and receives a first signaling in a first time-frequency resource set in step S11; and receives a first signal in a second time-frequency resource set in step S12.

The second node N2 transmits a first information block in step S20; and transmits a first signaling in a first time-frequency resource set in step S21; and transmits a first signal in a second time-frequency resource set in step S22.

In Embodiment 5, the first signaling is used for indicating a target reference signal resource; a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set; the first time-frequency resource set comprises a first time-frequency resource subset and a second time-frequency resource subset; the first time-frequency resource subset and the second time-frequency resource subset are respectively associated with a first control resource set and a second control resource set, and the first control resource set and the second control resource set are respectively associated with a first search space set and a second search space set; the first search space set and the second search space set are associated; the first information block is used for indicating that the first search space set and the second search space set are associated.

In one embodiment, the target reference signal resource set is one of N reference signal resource sets, N being a positive integer greater than 1; at least either of the frequency-domain resources occupied by the second time-frequency resource set or the time-domain resources occupied by the second time-frequency resource set are used to determine the target reference signal resource set out of the N reference signal resource sets.

In one subembodiment, N is equal to 2.

In one subembodiment, N is equal to 3.

In one subembodiment, the N reference signal resource sets include a first reference signal resource set and a second reference signal resource set, where a first control resource set and a second control resource set are respectively associated with the first reference signal resource set and the second reference signal resource set.

In one subembodiment, an RRC signaling configuring a first control resource set is used for indicating the first reference signal resource set.

In one subembodiment, an RRC signaling configuring a second control resource set is used for indicating the second reference signal resource set.

In one subembodiment, the first reference signal resource set is indicated by a MAC CE, the MAC CE being also used for indicating a CORESET pool to which the first control resource set belongs.

In one subembodiment, the second reference signal resource set is indicated by a MAC CE, the MAC CE being also used for indicating a CORESET pool to which the second control resource set belongs.

In one subembodiment, the first reference signal resource set comprises N1 reference signal resources, where N1 is a positive integer greater than 1, any reference signal resource among the N1 reference signal resources comprising at least one of a CSI-RS resource or an SSB.

In one subembodiment, the second reference signal resource set comprises N2 reference signal resources, where N2 is a positive integer greater than 1, any reference signal resource among the N2 reference signal resources comprising at least one of a CSI-RS resource or an SSB.

In one subembodiment, the N reference signal resource sets include a first reference signal resource set and a second reference signal resource set, where one of a first control resource set or a second control resource set is associated with the first reference signal resource set, while the second reference signal resource set is associated with both the first control resource set and the second control resource set.

In one subembodiment, the N reference signal resource sets include a first reference signal resource set, a second reference signal resource set and a third reference signal resource set; a first control resource set and a second control resource set are respectively associated with the first reference signal resource set and the second reference signal resource set.

In one subsidiary embodiment of the above subembodiment, the third reference signal resource set is associated with both the first control resource set and the second control resource set.

In one subsidiary embodiment of the above subembodiment, the third reference signal resource set is associated with a control resource set other than the first control resource set and the second control resource set.

In one subembodiment, the third reference signal resource set comprises N3 reference signal resources, where N3 is a positive integer greater than 1, any reference signal resource among the N3 reference signal resources comprising at least one of a CSI-RS resource or an SSB.

In one subembodiment, the first reference signal resource set and the second reference signal resource set are respectively associated with a first control resource set pool and a second control resource set pool, where the first control resource set pool comprises a first control resource set, while the second control resource set pool comprises a second control resource set; the first time-frequency resource set comprises frequency-domain resources occupied by a first control resource set and frequency-domain resources occupied by a second control resource set.

In one subsidiary embodiment of the above subembodiment, the first control resource set pool and the second control resource set pool are respectively associated with two TRPs.

In one subsidiary embodiment of the above subembodiment, the first control resource set pool comprises Z1 CORESET(s), Z1 being a positive integer, where the first control resource set is one CORESET of the Z1 CORESET(s).

In one subsidiary embodiment of the above subembodiment, the second control resource set pool comprises Z2 CORESET(s), Z2 being a positive integer, where the second control resource set is one CORESET of the Z2 CORESET(s).

In one embodiment, the first control resource set in the present application is a CORESET.

In one embodiment, the second control resource set in the present application is a CORESET.

In one embodiment, the first time-frequency resource set comprises frequency-domain resources occupied by a first control resource set and frequency-domain resources occupied by a second control resource set.

In one embodiment, the first time-frequency resource set comprises at least either of frequency-domain resources occupied by a first control resource set or frequency-domain resources occupied by a second control resource set.

In one embodiment, at least either of the frequency-domain resources occupied by the second time-frequency resource set or the time-domain resources occupied by the second time-frequency resource set are used to determine a first integer, the first integer used for determining the target reference signal resource set.

In one subembodiment, N is equal to 2, and the N reference signal resource sets are respectively a first reference signal resource set and a second reference signal resource set; when a remainder yielded by the first integer divided by N is equal to 0, the target reference signal resource set is the first reference signal resource set; or when a remainder yielded by the first integer divided by N is equal to 1, the target reference signal resource set is the second reference signal resource set.

In one subembodiment, N is equal to 3, and the N reference signal resource sets are respectively a first reference signal resource set, a second reference signal resource set and a third reference signal resource set; when a remainder yielded by the first integer divided by N is equal to 0, the target reference signal resource set is the first reference signal resource set; or when a remainder yielded by the first integer divided by N is equal to 1, the target reference signal resource set is the second reference signal resource set; or when a remainder yielded by the first integer divided by N is equal to 2, the target reference signal resource set is the third reference signal resource set.

In one subembodiment, the first integer is equal to a number of RBs occupied by the second time-frequency resource set in frequency domain.

In one subembodiment, the first integer is equal to an index for an RB with a smallest index among all RBs occupied by the second time-frequency resource set in frequency domain.

In one subembodiment, the first integer is equal to an index for an RB with a largest index among all RBs occupied by the second time-frequency resource set in frequency domain.

In one subembodiment, the first integer is equal to a number of OFDM symbols occupied by the second time-frequency resource set in time domain.

In one subembodiment, an OFDM symbol which is the earliest in time domain among all OFDM symbols occupied by the second time-frequency resource set is an i-th OFDM symbol in a slot, where the first integer is equal to (i−1).

In one subembodiment, the first integer is equal to a number of REs occupied by the second time-frequency resource set.

In one subembodiment, a quotient of the number of REs occupied by the second time-frequency resource set divided by 12 is equal to W, where the first integer is a largest integer no greater than W.

In one subembodiment, a quotient of the number of REs occupied by the second time-frequency resource set divided by 12 is equal to W, where the first integer is a smallest integer no less than W.

In one subembodiment, the first integer is equal to a product of the number of RBs occupied by the second time-frequency resource set in frequency domain and the number of OFDM symbols occupied by the second time-frequency resource set in time domain.

In one embodiment, frequency-domain resources occupied by the first time-frequency resource subset belong to frequency-domain resources occupied by the first control resource set.

In one embodiment, frequency-domain resources occupied by the first time-frequency resource subset are equivalent to frequency-domain resources occupied by the first control resource set.

In one embodiment, frequency-domain resources occupied by the second time-frequency resource subset belong to frequency-domain resources occupied by the second control resource set.

In one embodiment, frequency-domain resources occupied by the second time-frequency resource subset are equivalent to frequency-domain resources occupied by the second control resource set.

In one embodiment, time-domain resources occupied by the first time-frequency resource subset belong to time-domain resources occupied by the first search space set.

In one embodiment, time-domain resources occupied by the second time-frequency resource subset belong to time-domain resources occupied by the second search space set.

In one embodiment, the first search space set is a Search Space Set.

In one embodiment, the first search space set is a Search Space.

In one embodiment, the second search space set is a Search Space Set.

In one embodiment, the second search space set is a Search Space.

In one embodiment, the first search space set and the second search space set are used for combined PDCCH blind detection.

In one embodiment, at least one PDCCH candidate comprised by the first search space set can be demodulated combined with at least one PDCCH candidate comprised by the second search space set.

In one embodiment, the first information block is transmitted through an RRC signaling.

In one embodiment, the first information block comprises a SearchSpace IE in TS 38.331.

In one embodiment, a name of the first information block includes Search Space.

In one embodiment, a name of the first information block includes ControlResourceSet.

In one embodiment, the sentence that the first search space set and the second search space set are associated means that: a number of Aggregation levels (Als) supported by the first search space set is equal to a number of Als supported by the second search space set, and an index of (a) PDCCH candidate(s) in the first search space set is identical to an index of (a) PDCCH candidate(s) in the second search space set.

In one subembodiment, the PDCCH candidate in the present application is a PDCCH Candidate.

In one subembodiment, a number of PDCCH candidate(s) comprised by the first search space set in the first control resource set is equal to a number of PDCCH candidate(s) comprised by the second search space set in the second control resource set.

In one subembodiment, a number of Control Channel Element(s) (CCE(s)) comprised by the first search space set in the first control resource set is equal to a number of Control Channel Element(s) (CCE(s)) comprised by the second search space set in the second control resource set.

In one embodiment, the first time-frequency resource subset comprises M1 first-type control channel candidates, while the second time-frequency resource subset comprises M1 second-type control channel candidates; Resource Elements (REs) occupied by the first time-frequency resource subset and REs occupied by the second time-frequency resource subset are orthogonal; the first signaling occupies one of the M1 first-type control channel candidates, and the first signaling occupies one of the M1 second-type control channel candidates; M1 is a positive integer greater than 1.

In one subembodiment, any first-type control channel candidate among the M1 first-type control channel candidates is a PDCCH Candidate.

In one subembodiment, any second-type control channel candidate among the M1 second-type control channel candidates is a PDCCH Candidate.

In one subembodiment, the first signaling carries a first control information block, where the first time-frequency resource subset and the second time-frequency resource subset are respectively used for two repetitions of the first control information block.

In one subembodiment, the first signaling carries a first control information block, where the first-type control channel candidate occupied by the first signaling in the first time-frequency resource subset and the second-type control channel candidate occupied by the first signaling in the second time-frequency resource subset are respectively used for two repetitions of the first control information block.

In one subembodiment, the first signaling carries a first control information block, where the first node U1 assumes that the first time-frequency resource subset and the second time-frequency resource subset are respectively used for two repetitions of the first control information block.

In one subembodiment, time-frequency resources occupied by the first signaling belong to a first time-frequency resource subset, or, time-frequency resources occupied by the first signaling belong to a second time-frequency resource subset; the first signaling carries a first control information block, where the first time-frequency resource subset and the second time-frequency resource subset are respectively used for two repetitions of the first control information block.

In one subembodiment, the first signaling comprises a first sub-signaling and a second sub-signaling; the first sub-signaling occupies one of the M1 first-type control channel candidates, and the second sub-signaling occupies one of the M1 second-type control channel candidates.

In one subsidiary embodiment of the above subembodiment, the first sub-signaling and the second sub-signaling both carry a first control information block.

In one subsidiary embodiment of the above subembodiment, the first sub-signaling and the second sub-signaling carry an identical DCI.

In one subsidiary embodiment of the above subembodiment, the first sub-signaling and the second sub-signaling carry different fields in a same DCI.

In one subsidiary embodiment of the above subembodiment, the first sub-signaling and the second sub-signaling are both used for scheduling the first signal.

In one subsidiary embodiment of the above subembodiment, the first sub-signaling and the second sub-signaling both indicate a second time-frequency resource set.

In one subsidiary embodiment of the above subembodiment, one of the first sub-signaling or the second sub-signaling indicates a second time-frequency resource set.

Embodiment 6

Embodiment 6 illustrates a schematic diagram of a target reference signal resource set, as shown in FIG. 6. In FIG. 6, the target reference signal resource set comprises K1 candidate reference signal resources, where K1 is a positive integer greater than 1, the K1 candidate reference signal resources respectively corresponding to K1 beams in the figure.

In one embodiment, the K1 candidate reference signal resources respectively correspond to K1 TCIs.

In one embodiment, the K1 candidate reference signal resources respectively correspond to K1 TCI states.

In one embodiment, the K1 candidate reference signal resources respectively correspond to K1 TCI-StateIds.

In one embodiment, the K1 candidate reference signal resources respectively correspond to K1 beamforming vectors.

In one embodiment, the K1 candidate reference signal resources respectively correspond to K1 Spatial Rx Parameters.

Embodiment 7

Figures 7, 8, 9, 10:
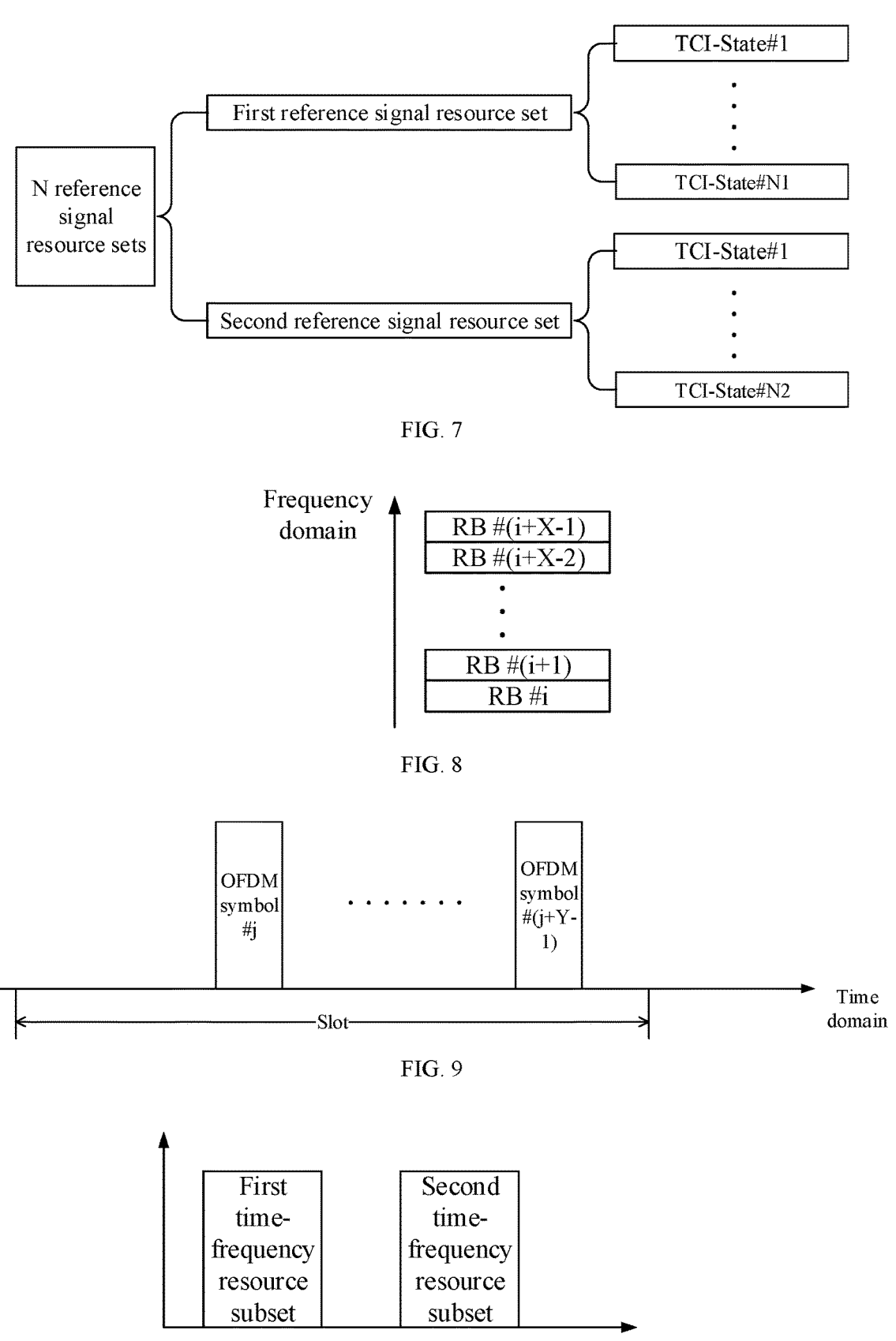
FIG. 7 illustrates a schematic diagram of N reference signal resource sets according to one embodiment of the present application.
FIG. 8 illustrates a schematic diagram of a first integer according to one embodiment of the present application.
FIG. 9 illustrates a schematic diagram of a first integer according to another embodiment of the present application.
FIG. 10 illustrates a schematic diagram of the first time-frequency resource subset and the second time-frequency resource subset according to one embodiment of the present application.

Embodiment 7 illustrates a schematic diagram of N reference signal resource sets, as shown in FIG. 7. In FIG. 7, N as illustrated is equal to 2, and the N reference signal resource sets are respectively a first reference signal resource set and a second reference signal resource set; the first reference signal resource set comprises N1 reference signal resources, the N1 reference signal resources respectively corresponding to TCI-State #1 through TCI-State #N1; the second reference signal resource set comprises N2 reference signal resources, the N2 reference signal resources respectively corresponding to TCI-State #1 through TCI-State #N2.

In one embodiment, the first reference signal resource set and the second reference signal resource set are respectively associated with two CORESET Pool IDs.

In one embodiment, the first reference signal resource set and the second reference signal resource set are respectively associated with two TRPs.

In one embodiment, the first reference signal resource set and the second reference signal resource set are respectively associated with two Serving Cells.

Embodiment 8

Embodiment 8 illustrates a schematic diagram of a first integer, as shown in FIG. 8. In FIG. 8, the first integer is equal to an index for an RB with a smallest index among all RBs occupied by the second time-frequency resource set in frequency domain; In FIG. 8, a total of X RBs from RB #i to RB #(i+X−1) are occupied by the first time-frequency resource set, where X is a positive integer greater than 1; the first integer is equal to i, i being a non-negative integer.

In one embodiment, the first integer is a non-negative integer.

In one embodiment, the first integer is a positive integer.

In one embodiment, indexes for all RBs occupied by the second time-frequency resource set in frequency domain are contiguous.

In one embodiment, indexes for all RBs occupied by the second time-frequency resource set in frequency domain are discrete.

Embodiment 9

Embodiment 9 illustrates a schematic diagram of a first integer, as shown in FIG. 9. In FIG. 9, the first integer is equal to an index of an OFDM symbol in a corresponding slot, which is the earliest in time domain among all OFDM symbols occupied by the second time-frequency resource set in time domain; In FIG. 9, a total of Y OFDM symbols from OFDM symbol #j to OFDM symbol #(j+Y−1) in a slot are occupied by the first time-frequency resource set, where Y is a positive integer greater than 1; the first integer is equal to j, j being a non-negative integer.

In one embodiment, the first integer is a non-negative integer.

In one embodiment, the first integer is a positive integer.

In one embodiment, all OFDM symbols occupied by the second time-frequency resource set in time domain are contiguous.

In one embodiment, all OFDM symbols occupied by the second time-frequency resource set in time domain are discrete.

Embodiment 10

Embodiment 10 illustrates a schematic diagram of a first time-frequency resource subset and a second time-frequency resource subset, as shown in FIG. 10. In FIG. 10, the first time-frequency resource subset occupies more than one RE, while the second time-frequency resource subset occupies more than one RE.

In one embodiment, frequency-domain resources occupied by the first time-frequency resource subset are identical to frequency-domain resources occupied by the first control resource set in the present application.

In one embodiment, frequency-domain resources occupied by the second time-frequency resource subset are identical to frequency-domain resources occupied by the second control resource set in the present application.

In one embodiment, time-domain resources occupied by the first time-frequency resource subset belong to time-domain resources occupied by the first search space set in the present application.

In one embodiment, time-domain resources occupied by the second time-frequency resource subset belong to time-domain resources occupied by the second search space set in the present application.

Embodiment 11

Figure 11:
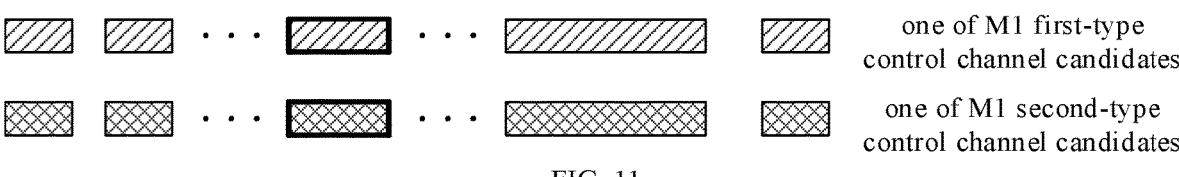
FIG. 11 illustrates a schematic diagram of a first signaling according to one embodiment of the present application.

Embodiment 11 illustrates a schematic of a first signaling, as shown in FIG. 11. In FIG. 11, the first time-frequency resource subset comprises M1 first-type control channel candidates, while the second time-frequency resource subset comprises M1 second-type control channel candidates; the first signaling occupies a given first-type control channel candidate among the M1 first-type control channel candidates, and the first signaling occupies a given second-type control channel candidate among the M1 second-type control channel candidates; Each box framed with thick lines in FIG. 11 represents a control channel candidate occupied by the first signaling.

In one embodiment, an Aggregation level (Al) used by the given first-type control channel candidate is identical to that used by the given second-type control channel candidate.

In one embodiment, an Aggregation level (Al) used by the given first-type control channel candidate is identical to that used by the given second-type control channel candidate.

In one embodiment, an index of a CCE with a smallest index occupied by the given first-type control channel candidate in the first time-frequency resource subset is identical to an index of a CCE with a smallest index occupied by the given second-type control channel candidate in the second time-frequency resource subset.

Embodiment 12

Figure 12:
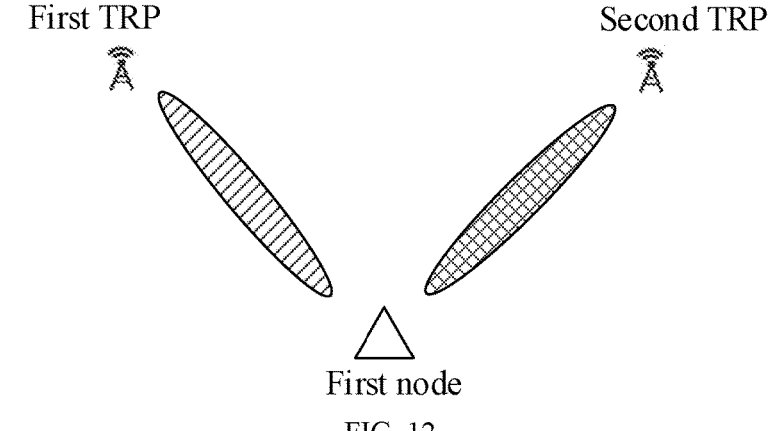
FIG. 12 illustrates a schematic diagram of an application scenario according to one embodiment of the present application.

Embodiment 12 illustrates a schematic of an application scenario, as shown in FIG. 12. In FIG. 12, the first control resource set and the second control resource set are respectively configured for a first TRP and a second TRP of a first cell, and the first node receives PDCCHs from both TRPs simultaneously; the first search space set is associated with the first control resource set, while the second search space set is associated with the second control resource set.

In one embodiment, the first TRP and the second TRP respectively use two different CORESET Pool Indexes.

In one embodiment, the first TRP and the second TRP are connected by an X2 interface.

In one embodiment, there exists a backhaul connection between the first TRP and the second TRP.

Embodiment 13

Figure 13:
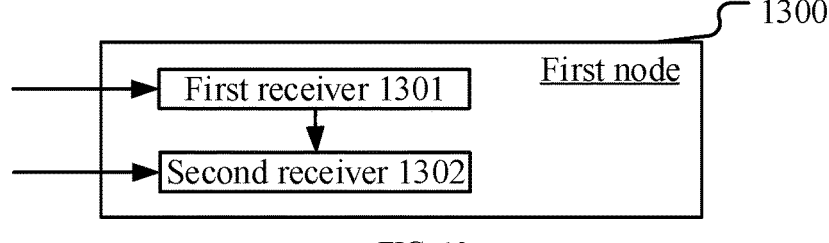
FIG. 13 illustrates a structure block diagram of a processing device in a first node according to one embodiment of the present application.

Embodiment 13 illustrates a structure block diagram of a first node, as shown in FIG. 13. In FIG. 13, a first node 1300 comprises a first receiver 1301 and a second receiver 1302.

The first receiver 1301 receives a first signaling in a first time-frequency resource set, the first signaling indicating a target reference signal resource; and the second receiver 1302 receives a first signal in a second time-frequency resource set.

In Embodiment 13, a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set are used to determine the target reference signal resource set.

In one embodiment, the target reference signal resource set is one of N reference signal resource sets, N being a positive integer greater than 1; at least either of the frequency-domain resources occupied by the second time-frequency resource set or the time-domain resources occupied by the second time-frequency resource set are used to determine the target reference signal resource set out of the N reference signal resource sets.

In one embodiment, at least either of the frequency-domain resources occupied by the second time-frequency resource set or the time-domain resources occupied by the second time-frequency resource set are used to determine a first integer, the first integer used for determining the target reference signal resource set.

In one embodiment, the first time-frequency resource set comprises a first time-frequency resource subset and a second time-frequency resource subset; the first time-frequency resource subset and the second time-frequency resource subset are respectively associated with a first control resource set and a second control resource set, and the first control resource set and the second control resource set are respectively associated with a first search space set and a second search space set; the first search space set and the second search space set are associated.

In one embodiment, the first receiver 1301 receives a first information block, the first information block used for indicating that the first search space set and the second search space set are associated.

In one embodiment, the sentence that the first search space set and the second search space set are associated means that: a number of Aggregation levels (Als) supported by the first search space set is equal to a number of Als supported by the second search space set, and an index of (a) PDCCH candidate(s) in the first search space set is identical to an index of (a) PDCCH candidate(s) in the second search space set.

In one embodiment, the first time-frequency resource subset comprises M1 first-type control channel candidates, while the second time-frequency resource subset comprises M1 second-type control channel candidates; Resource Elements (REs) occupied by the first time-frequency resource subset and REs occupied by the second time-frequency resource subset are orthogonal; the first signaling occupies one of the M1 first-type control channel candidates, and the first signaling occupies one of the M1 second-type control channel candidates; M1 is a positive integer greater than 1.

In one embodiment, the first receiver 1301 comprises at least the first four of the antenna 452, the receiver 454, the multi-antenna receiving processor 458, the receiving processor 456 and the controller/processor 459 in Embodiment 4.

In one embodiment, the second receiver 1302 comprises at least the first four of the antenna 452, the receiver 454, the multi-antenna receiving processor 458, the receiving processor 456 and the controller/processor 459 in Embodiment 4.

Embodiment 14

Figure 14:
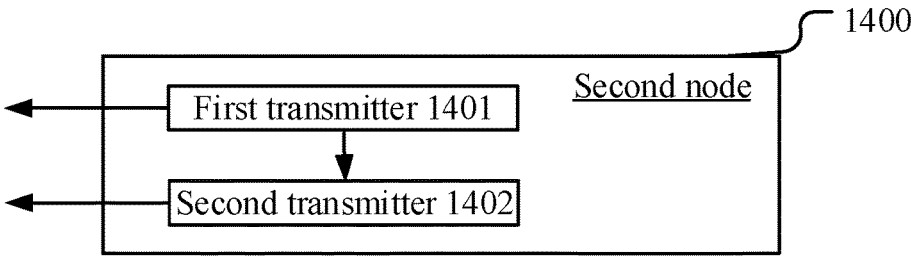
FIG. 14 illustrates a structure block diagram a processing device in a second node according to one embodiment of the present application.

Embodiment 14 illustrates a structure block diagram of a second node, as shown in FIG. 14. In FIG. 14, a second node 1400 comprises a first transmitter 1401 and a second transmitter 1402.

The first transmitter 1401 transmits a first signaling in a first time-frequency resource set, the first signaling indicating a target reference signal resource; and the second transmitter 1402 transmits a first signal in a second time-frequency resource set.

In Embodiment 14, a demodulation reference signal (DMRS) of a channel occupied by the first signal is quasi co-located (QCL) with the target reference signal resource; a target reference signal resource set comprises K1 candidate reference signal resources, with the first signaling used for indicating the target reference signal resource among the K1 candidate reference signal resources, K1 being a positive integer greater than 1; at least either of frequency-domain resources occupied by the second time-frequency resource set or time-domain resources occupied by the second time-frequency resource set is used to determine the target reference signal resource set.

In one embodiment, the target reference signal resource set is one of N reference signal resource sets, N being a positive integer greater than 1; at least either of the frequency-domain resources occupied by the second time-frequency resource set or the time-domain resources occupied by the second time-frequency resource set are used to determine the target reference signal resource set out of the N reference signal resource sets.

In one embodiment, at least either of the frequency-domain resources occupied by the second time-frequency resource set or the time-domain resources occupied by the second time-frequency resource set are used to determine a first integer, the first integer used for determining the target reference signal resource set.

In one embodiment, the first time-frequency resource set comprises a first time-frequency resource subset and a second time-frequency resource subset; the first time-frequency resource subset and the second time-frequency resource subset are respectively associated with a first control resource set and a second control resource set, and the first control resource set and the second control resource set are respectively associated with a first search space set and a second search space set; the first search space set and the second search space set are associated.

In one embodiment, the first transmitter 1401 transmits a first information block, the first information block used for indicating that the first search space set and the second search space set are associated.

In one embodiment, the sentence that the first search space set and the second search space set are associated means that: a number of Aggregation levels (Als) supported by the first search space set is equal to a number of Als supported by the second search space set, and an index of (a)

PDCCH candidate(s) in the first search space set is identical to an index of (a) PDCCH candidate(s) in the second search space set.

In one embodiment, the first time-frequency resource subset comprises M1 first-type control channel candidates, while the second time-frequency resource subset comprises M1 second-type control channel candidates; Resource Elements (REs) occupied by the first time-frequency resource subset and REs occupied by the second time-frequency resource subset are orthogonal; the first signaling occupies one of the M1 first-type control channel candidates, and the first signaling occupies one of the M1 second-type control channel candidates; M1 is a positive integer greater than 1.

In one embodiment, the first transmitter 1401 comprises at least the first four of the antenna 420, the transmitter 418, the multi-antenna transmitting processor 471, the transmitting processor 416 and the controller/processor 475 in Embodiment 4.

In one embodiment, the second transmitter 1402 comprises at least the first four of the antenna 420, the transmitter 418, the multi-antenna transmitting processor 471, the transmitting processor 416 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node in the present application includes but is not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The second node in the present application includes but is not limited to macro-cellular base stations, micro-cellular base stations, home base stations, relay base station, eNB, gNB, Transmitter Receiver Point (TRP), GNSS, relay satellite, satellite base station, airborne base station, RSU, unmanned ariel vehicle, test equipment like transceiving device simulating partial functions of base station or signaling tester, and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE), comprising:
   a transmitter;
   a receiver; and
   a processor;
   wherein the transmitter, the receiver, and the processor are configured to:
   receive, in a first time-frequency resource set, downlink control information (DCI) indicating a target reference signal resource; and receive, in a second time-frequency resource set, a physical downlink shared channel (PDSCH);

wherein a target reference signal resource set includes a plurality of candidate reference signal resources, and the DCI indicates the target reference signal resource among the plurality of candidate reference signal resources;

wherein a demodulation reference signal (DMRS) associated with the PDSCH is quasi co-located (QCL) with the target reference signal resource.

2. The UE of claim 1, wherein at least one of frequency-domain resources occupied by the second time-frequency resource set and time-domain resources occupied by the second time-frequency resource set is used by the UE to determine the target reference signal resource set.

3. The UE of claim 1, wherein the first time-frequency resource set includes at least one control resource set (CORESET), and the DCI is carried on a physical downlink control channel (PDCCH) that occupies resources of the CORESET.

4. The UE of claim 1, wherein the DCI includes a transmission configuration indication (TCI) field, and the target reference signal resource corresponds to a TCI state or a TCI-StateId indicated by the TCI field, and each of the plurality of candidate reference signal resources corresponds to a respective one of the TCI state or TCI-StateId.

5. The UE of claim 1, wherein the first time-frequency resource set includes a first time-frequency resource subset and a second time-frequency resource subset, the first and second time-frequency resource subsets being respectively associated with a first control resource set and a second control resource set, the first and second control resource sets being respectively associated with a first search space set and a second search space set.

6. The UE of claim 5, wherein the first time-frequency resource subset includes a plurality of first-type control channel candidates and the second time-frequency resource subset includes a plurality of second-type control channel candidates.

7. The UE of claim 1, wherein the target reference signal resource set is one of a plurality of reference signal resource sets, and at least one of frequency-domain resources occupied by the second time-frequency resource set and time-domain resources occupied by the second time-frequency resource set is used to select, from among the plurality of reference signal resource sets, the target reference signal resource set.

8. The UE of claim 1, wherein at least one of frequency-domain resources occupied by the second time-frequency resource set and time-domain resources occupied by the second time-frequency resource set is used by the UE to determine an integer, and the integer is used to determine the target reference signal resource set.

9. The UE of claim 8, wherein the integer is one of:
   (i) a number of resource blocks (RBs) occupied by the second time-frequency resource set in a frequency domain;
   (ii) an index of an RB with a smallest index among RBs occupied by the second time-frequency resource set in the frequency domain;
   (iii) an index of an RB with a largest index among RBs occupied by the second time-frequency resource set in the frequency domain; or
   (iv) a number of orthogonal frequency division multiplexing (OFDM) symbols occupied by the second time-frequency resource set in a time domain.

10. The UE of claim 1, wherein both frequency-domain resources occupied by the second time-frequency resource set and time-domain resources occupied by the second time-frequency resource set are used together by the UE to determine the target reference signal resource set.

11. A method performed by a user equipment (UE), the method comprising:
   receiving, in a first time-frequency resource set, downlink control information (DCI) indicating a target reference signal resource; and
   receiving, in a second time-frequency resource set, a physical downlink shared channel (PDSCH);
   wherein a target reference signal resource set includes a plurality of candidate reference signal resources, and the DCI indicates the target reference signal resource among the plurality of candidate reference signal resources;
   wherein a demodulation reference signal (DMRS) associated with the PDSCH is quasi co-located (QCL) with the target reference signal resource.

12. The method of claim 11, wherein at least one of frequency-domain resources occupied by the second time-frequency resource set and time-domain resources occupied by the second time-frequency resource set is used by the UE to determine the target reference signal resource set.

13. The method of claim 11, wherein the first time-frequency resource set includes at least one control resource set (CORESET), and the DCI is carried on a physical downlink control channel (PDCCH) that occupies resources of the CORESET.

14. The method of claim 11, wherein the DCI includes a transmission configuration indication (TCI) field, and the target reference signal resource corresponds to a TCI state or a TCI-StateId indicated by the TCI field, and each of the plurality of candidate reference signal resources corresponds to a respective one of the TCI state or TCI-StateId.

15. The method of claim 11, wherein the first time-frequency resource set includes a first time-frequency resource subset and a second time-frequency resource subset, the first and second time-frequency resource subsets being respectively associated with a first control resource set and a second control resource set, the first and second control resource sets being respectively associated with a first search space set and a second search space set.

16. The method of claim 15, wherein the first time-frequency resource subset includes a plurality of first-type control channel candidates and the second time-frequency resource subset includes a plurality of second-type control channel candidates.

17. The method of claim 11, wherein the target reference signal resource set is one of a plurality of reference signal resource sets, and at least one of frequency-domain resources occupied by the second time-frequency resource set and time-domain resources occupied by the second time-frequency resource set is used to select, from among the plurality of reference signal resource sets, the target reference signal resource set.

18. The method of claim 11, wherein at least one of frequency-domain resources occupied by the second time-frequency resource set and time-domain resources occupied by the second time-frequency resource set is used by the UE to determine an integer, and the integer is used to determine the target reference signal resource set.

19. The method of claim 18, wherein the integer is one of:
   (i) a number of resource blocks (RBs) occupied by the second time-frequency resource set in a frequency domain;

(ii) an index of an RB with a smallest index among RBs occupied by the second time-frequency resource set in the frequency domain;

(iii) an index of an RB with a largest index among RBs occupied by the second time-frequency resource set in the frequency domain; or (iv) a number of orthogonal frequency division multiplexing (OFDM) symbols occupied by the second time-frequency resource set in a time domain.

20. The method of claim 11, wherein both frequency-domain resources occupied by the second time-frequency resource set and time-domain resources occupied by the second time-frequency resource set are used together by the UE to determine the target reference signal resource set.

* * * * *